United States Patent [19]

Hoshiya et al.

[11] Patent Number: 6,010,428
[45] Date of Patent: Jan. 4, 2000

[54] GEARSHIFT CONTROL APPARATUS FOR AUTOMATIC TRANSMISSION

[75] Inventors: Kazumi Hoshiya, Gotenba; Hidehiro Oba, Numazu, both of Japan

[73] Assignee: Toyota Jidosha Kabushiki Kaisha, Toyota, Japan

[21] Appl. No.: 09/104,388

[22] Filed: Jun. 25, 1998

[30] Foreign Application Priority Data

Jun. 25, 1997 [JP] Japan .................................. 9-168379

[51] Int. Cl.$^7$ .................................................. F16H 61/08
[52] U.S. Cl. ........................................ 477/148; 477/149
[58] Field of Search ................................ 477/148, 149, 477/161

[56] References Cited

U.S. PATENT DOCUMENTS

| | | |
|---|---|---|
| 4,653,351 | 3/1987 | Downs et al. . |
| 4,796,490 | 1/1989 | Butts et al. ............................ 477/148 |
| 5,070,747 | 12/1991 | Lentz et al. ............................ 477/149 |
| 5,810,693 | 9/1998 | Nakayama et al. ..................... 477/148 |

FOREIGN PATENT DOCUMENTS 6-8665  2/1994  Japan .

*Primary Examiner*—Sherry L. Estremsky
*Attorney, Agent, or Firm*—Oblon, Spivak, McClelland, Maier & Neustadt, P.C.

[57] ABSTRACT

In a gearshift control apparatus for an automatic transmission which performs a downshift under power ON state, after a command for a clutch-to-clutch downshift has been issued, the hydraulic pressure of a higher-speed-stage side clutch is first lowered to raise the input r.p.m. of the transmission. When the beginning of rise in the input r.p.m. of the transmission has been detected, the hydraulic pressure of the higher-speed-stage side clutch is subjected to a feedback control so that the change rate of the input r.p.m. of the transmission may become a specific value. Upon the detection that the input r.p.m. of the transmission have come near to the synchronous r.p.m. of a lower speed stage, the hydraulic pressure of the lower-speed-stage side clutch is gradually raised, and simultaneously, the hydraulic pressure of the higher-speed-stage side clutch is subjected to a feedback control on the basis of the input r.p.m. of the transmission.

10 Claims, 14 Drawing Sheets

FIG.3

| | C0 | C1 | C2 | B0 | B1 | B2 | B3 | B4 | F0 | F1 | F2 | AUXILIARY | MAIN | GEAR RATIO | USE |
|---|---|---|---|---|---|---|---|---|---|---|---|---|---|---|---|
| N | | | | ○(dashed) | | | | | | | | — | — | — | ◎ |
| REV | ○ | | ○ | ○ | | | | ○ | | | | HIGH | REV | 3.488 | ◎ |
| 1ST | ● | ○ | | | | | | ● | ○ | | ○ | LOW | 1ST | 3.357 | ◎ |
| 1.5TH | | ○ | | ○ | | | | ● | ○ | | ○ | HIGH | 1ST | 2.527 | |
| 2ND | ● | ○ | | | | | ○ | | ○ | | | LOW | 2ST | 2.208 | ◎ |
| 2.5TH | | ○ | | | | ○ | ○ | | ○ | | | HIGH | 2ST | 1.663 | |
| 3RD | ● | ○ | | ○ | ● | ○ | | | | ○ | | LOW | 3ST | 1.418 | ◎ |
| 3.5TH | | ○ | | ○ | ● | | | | ○ | ○ | | HIGH | 3ST | 1.067 | |
| 4TH | ● | ○ | ○ | ○ | | | | | | | | LOW | 4ST | 1.000 | ◎ |
| 4.5ST (5TH) | | ○ | ○ | ○ | | | | | | | | HIGH | 4ST | 0.753 | ◎ |

GEARSHIFT CONTROL APPARATUS FOR AUTOMATIC TRANSMISSION

BACKGROUND OF THE INVENTION

1. Field of the Invention

The present invention relates to the hydraulic control system of an automatic transmission in which a clutch-to-clutch downshift based on the release of a higher-speed-stage side clutch and the engagement of a lower-speed-stage side clutch is effected in a power-ON state.

2. Description of the Prior Art

In effecting the specified gearshift of an automatic transmission installed in a motor vehicle, it is often the case that two clutches (each being a clutch in a broad sense, and including an ordinary clutch and a brake) must be respectively engaged and released at the same time (as a so-called "clutch-to-clutch gearshift"). In this case, unless the engagement and release of the respective clutches are accurately synchronized, the torque of the output shaft of the automatic transmission will fall suddenly, and/or the r.p.m. of the engine of the motor vehicle will rise abnormally.

The official gazette of Japanese Patent Application Publication No. 8665/1994 discloses an example of a control in the case where a clutch-to-clutch downshift is to be effected in a power-ON state. In this example, when the command of the downshift has been issued, the hydraulic pressure of a higher-speed-stage side clutch is first lowered. Subsequently, when the r.p.m. of a turbine have risen owing to decrease in the transmission torque capacity of the higher-speed-stage side clutch, the lowering of the hydraulic pressure of this clutch is stopped. Further, when the deviation between the r.p.m. of the turbine and the synchronous r.p.m. of a lower-speed-stage side has become a predetermined value or less, the hydraulic pressure of the lower-speed-stage side clutch is raised to keep the turbine r.p.m. Thereafter, the hydraulic pressure of the lower-speed-stage side clutch is gradually raised while gradually lowering that of the higher-speed-stage side clutch. Thus, the engagement and release of the clutches are changed-over.

With this control, however, a gearshift shock might be incurred in the latter half of the gearshift operation when, in the course of lowering the hydraulic pressure of the higher-speed-stage side clutch and raising that of the lower-speed-stage side clutch, the hydraulic pressures are deviated from expected design values due to the manufactural discrepancies, secular changes, etc. of the various dimensions of the clutches.

SUMMARY OF THE INVENTION

The present invention has been made in view of the problem of the prior art as stated above, and has for its object to provide a gearshift control apparatus for an automatic transmission in which a clutch-to-clutch downshift in a power-ON state is more appropriately controlled to relieve a gearshift shock and to realize a smooth gearshift.

The present invention has achieved the object by a gearshift control apparatus for an automatic transmission and as has its purport illustrated in FIG. 1. It is the premise of the gearshift control apparatus that a clutch-to-clutch downshift based on the release of a higher-speed-stage side clutch and the engagement of a lower-speed-stage side clutch is effected in a power-ON state. According to the gearshift control apparatus, detection means (downshift judgement means) detects the judgement that the downshift is to be effected. First control means lowers the hydraulic pressure of the higher-speed-stage side clutch upon the judgement that the downshift is to be effected. Detection means (rise detection means) detects the beginning of rise in the input r.p.m. of the transmission (which is detected by detection means for the input r.p.m. of the transmission), the rise being based on the operation of the first control means. Second control means subjects the hydraulic pressure of the higher-speed-stage side clutch to a feedback control after the detection of the beginning of the r.p.m. rise by the rise detection means, so that the rise rate of the input r.p.m. of the transmission may become a predetermined value. Detection means (near-synchroneity detection means) detects that the input r.p.m. of the transmission have been brought near to the synchronous r.p.m. of the lower speed stage by the operation of the second control means. Third control means gradually raises the hydraulic pressure of the lower-speed-stage side clutch and simultaneously subjects the hydraulic pressure of the higher-speed-stage side clutch to a feedback control on the basis of the input r.p.m. of the transmission, after the detection of the near synchroneity by the near-synchroneity detection means.

By the way, in this specification, the expression "power-ON state" shall signify the drive state of a motor vehicle in which power is being transmitted from the engine side of the motor vehicle to the wheel side thereof. In many cases, the power-ON state of the vehicle agrees with a state where the accelerator pedal of the motor vehicle is stepped on.

In the present invention, when the downshift has been judged in the power-ON state, the first control means lowers the hydraulic pressure of the higher-speed-stage side clutch. Subsequently, when the higher-speed-stage side clutch has begun to slide owing to decrease in the transmission torque capacity of this clutch, the input r.p.m. of the transmission rises. When the rise detection means has detected the beginning of the rise in the input r.p.m. of the transmission, the secondcontrol means subjects the hydraulic pressure of the higher-speed-stage side clutch to the feedback control so that the rise rate of the input r.p.m. of the transmission may become the predetermined value. Next, when the near-synchroneity detection means has detected that the input r.p.m. of the transmission have risen near to the synchronous r.p.m. of the lower speed stage (or have reached near the synchroneity), the third control means gradually raises the hydraulic pressure of the lower-speed-stage side clutch and simultaneously subjects that of the higher-speed-stage side clutch to the feedback control on the basis of the input r.p.m. of the transmission.

Incidentally, the word "near" in the phase "near to the synchronous r.p.m." mentioned above indicates that the input r.p.m. of the transmission need not be in perfect agreement with the synchronous r.p.m. It is not prohibited or excluded, for example, that the input r.p.m. of the transmission to be detected is set at a value which is somewhat "less than" the synchronous r.p.m. in consideration of responsiveness at very low temperatures, or that it is set at a value which somewhat "exceeds (is greater than)" the synchronous r.p.m. as in an aspect of performance to be described later.

According to the present invention, the hydraulic pressure of the higher-speed-stage side clutch is subjected to the feedback control so that the rise rate of the input r.p.m. of the transmission may become the predetermined value, during a time period since the higher-speed-stage side clutch has begun to slide and until the input r.p.m. of the transmission becomes near the synchronous speed of the lower speed stage. Therefore, the rise of the input r.p.m. of the transmission can be suitably controlled without regard to the manufactural discrepancies, etc. of the clutches. Besides, after the input r.p.m. of the transmission has become near the synchronous r.p.m. of the lower speed stage, the hydraulic pressure of the lower-speed-stage side clutch is gradually raised, and simultaneously, that of the higher-speed-stage side clutch is lowered by the feedback control while the input r.p.m. of the transmission is being monitored. Therefore, the hydraulic pressures can be smoothly switched with the input r.p.m. of the transmission synchronized accurately. Accordingly, a gearshift shock can be relieved in spite of the discrepancies of the clutches.

According to a further feature; the second control means alters the predetermined value midway of the gearshift so that the rise rate of the input r.p.m. of the transmission may become gentler. The second control means may set the predetermined value in accordance with the deviation between the synchronous r.p.m. of the lower speed stage and the input r.p.m. of the transmission. Thus, the torque variation of the entire gearshift is smoothened.

The third control means may subject the hydraulic pressure of the higher-speed-stage side clutch to the feedback control so that the input r.p.m. of the transmission may not change. Thus, the input r.p.m. of the transmission can be restrained from rising unnecessarily. The third control means may subject the hydraulic pressure of the higher-speed-stage side clutch to the feedback control so that the input r.p.m. of the transmission may not change from a target value which is set slightly higher than the synchronous r.p.m. of the lower speed stage. Thus, the input r.p.m. of the transmission can be restrained from rising unnecessarily, and the hydraulic pressure of the higher-speed-stage side clutch can be automatically and reliably lowered merely by performing the feedback control.

A time period in which the clutch on the lower-speed-stage side begins to have a transmission torque capacity after the completion of a "first quick fill" operation for the lower-speed-stage side clutch, may be detected, and a time period of the "first quick fill" operation for the lower-speed-stage side clutch is learnt and corrected on the basis of said detected time period. A timing of rise in the hydraulic pressure of the lower-speed-stage side clutch may be learnt and corrected similarly on the basis of the detected time period. In this way, the gearshift can be effected more preferably irrespective of the discrepancies of the various dimensions of the lower-speed-stage side clutch.

BRIEF DESCRIPTION OF THE DRAWINGS

FIG. 3 is a table showing the engaging operations of the frictional engagement devices of the automatic transmission;

DESCRIPTION OF THE PREFERRED EMBODIMENTS

Now, the aspects of performance of the present invention will be described with reference to the drawings.

Figure 1:
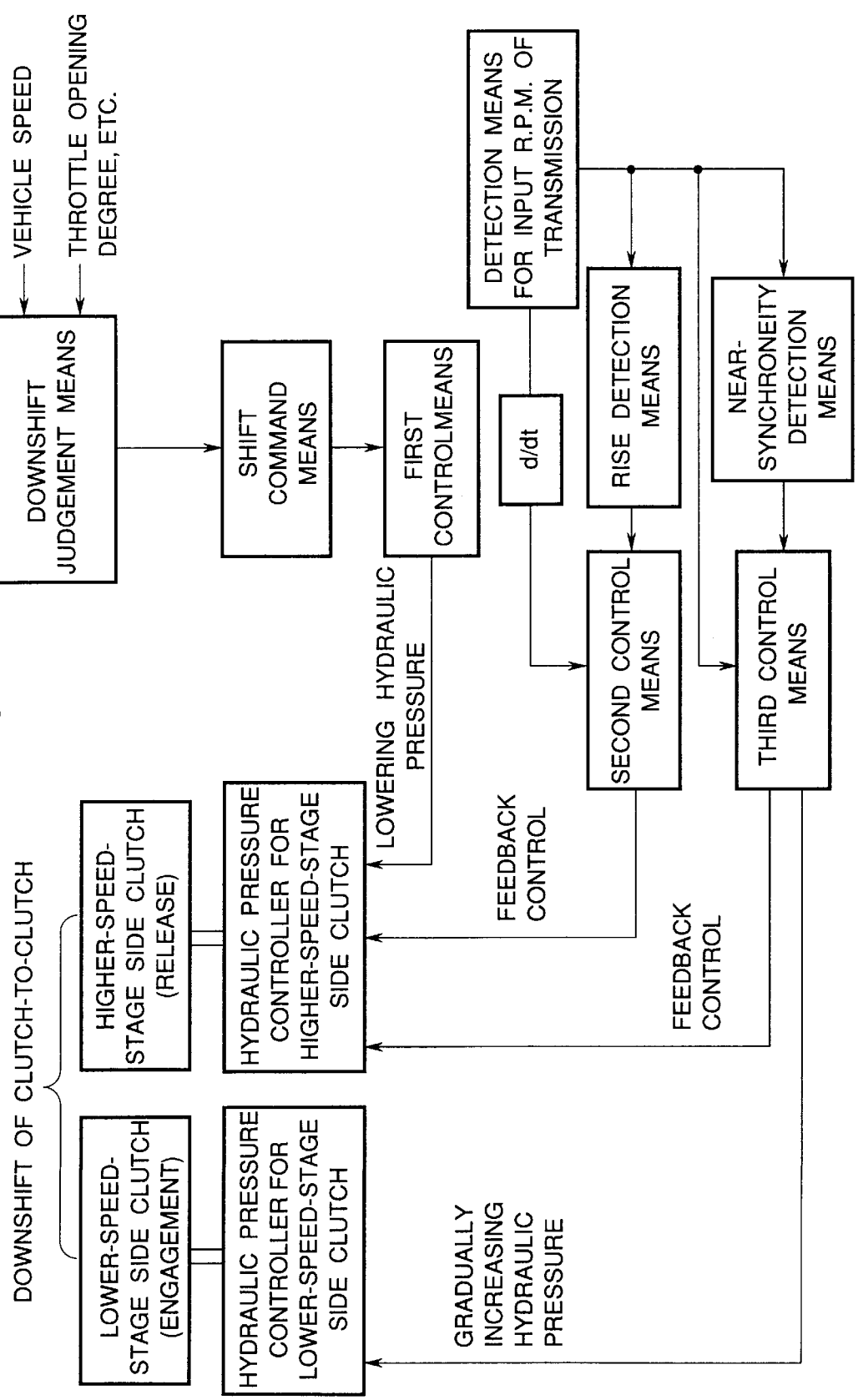
FIG. 1 is a block diagram showing the purport of the present invention.
Figure 2:
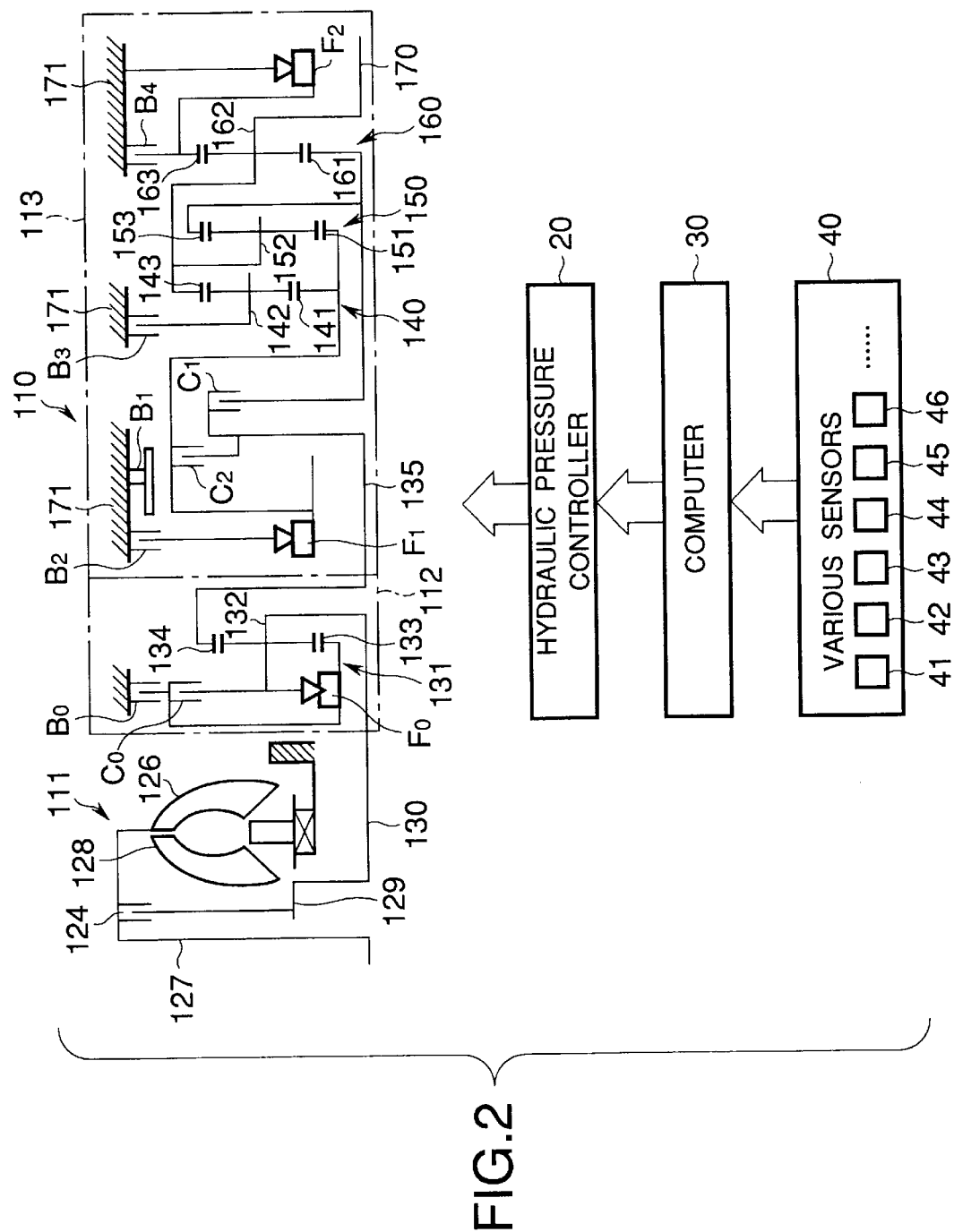
FIG. 2 is a block diagram schematically showing an automatic transmission for a motor vehicle to which the present invention is applied.

First, one practicable example of an automatic transmission to which the present invention is applied is skeletonized in FIG. 2. The automatic transmission 110 for a motor vehicle comprises a torque converter 111, an auxiliary gearshift portion 112 and a main gearshift portion 113.

The torque converter 111 includes a lockup clutch 124. The lockup clutch 124 is interposed between a front cover 127 which is unitary with a pump impeller 126, and a member (hub) 129 on which a turbine runner 128 is integrally mounted.

The crankshaft of an engine (not shown) is connected to the front cover 127. An input shaft (the input rotary shaft of the transmission) 130 connected to the turbine runner 128 is connected to the carrier 132 of a planetary gear mechanism 131. The planetary gear mechanism 131 constitutes the auxiliary gearshift portion 112 which serves for overdrive operation.

A clutch C0 and a one-way clutch F0 are interposed between the carrier 132 and sun gear 133 of the planetary gear mechanism 131. The one-way clutch F0 is brought into engagement in a case where the sun gear 133 is rotated forward (in the rotating direction of the input shaft 130) relatively to the carrier 132. Besides, a brake B0 is disposed in order to selectively stop the rotation of the sun gear 133.

A ring gear 134 which is the output element of the auxiliary gearshift portion 112, is connected to an intermediate shaft 135 which is the input element of the main gearshift portion 113. In a state where the clutch C0 or the one-way clutch F0 is engaged, the whole planetary gear mechanism 131 is unitarily rotated, and hence, the intermediate shaft 135 is rotated at the same speed as that of the input shaft 130. In a state where the brake B0 is engaged and where the rotation of the sun gear 133 is stopped, the ring gear 134 is rotated forward at a speed higher than that of the input shaft 130. Accordingly, the auxiliary gearshift portion 112 can be changed-over between two, "high" and "low" stages.

The main gearshift portion 113 includes three, planetary gear mechanisms 140, 150 and 160, which are interconnected as stated below.

The sun gear 141 of the first planetary gear mechanism 140 and the sun gear 151 of the second planetary gear mechanism 150 are unitarily connected to each other. Three members; the ring gear 143 of the first planetary gear mechanism 140, the carrier 152 of the second planetary gear mechanism 150 and the carrier 162 of the third planetary gear mechanism 160 are connected to one another. An output shaft 170 is connected to the carrier 162 of the third planetary gear mechanism 160. The ring gear 153 of the second planetary gear mechanism 150 is connected to the sun gear 161 of the third planetary gear mechanism 160.

The gear train of the main gearshift portion 113 can set one reverse stage and four forward stages. In order to realize the stages, clutches and brakes are disposed as stated below.

A clutch C1 is interposed between the intermediate shaft 135 and the ring gear 153 of the second planetary gear mechanism 150, as well as the sun gear 161 of the third planetary gear mechanism 160. A clutch C2 is interposed between the intermediate shaft 135 and the sun gear 141 of the first planetary gear mechanism 140, as well as the sun gear 151 of the second planetary gear mechanism 150. A brake B1 is arranged for stopping the rotations of the respective sun gears 141 and 151 of the first planetary gear mechanism 140 and the second planetary gear mechanism 150. A one-way clutch F1 and a brake B2 are arrayed in series between the sun gears 141, 151 and a casing 171. The one-way clutch F1 is engaged in a case where the sun gears 141, 151 are about to be rotated reversely (in the opposite direction to the rotating direction of the input shaft 135).

A brake B3 is interposed between the carrier 142 of the first planetary gear mechanism 140 and the casing 171. Besides, as elements for stopping the rotation of the ring gear 163 of the third planetary gear mechanism 160, a brake B4 and a one-way clutch F2 are arrayed in parallel between the ring gear 163 and the casing 171. The one-way clutch F2 is engaged in a case where the ring gear 163 is about to be rotated reversely.

In the above automatic transmission 110, the auxiliary gearshift portion 112 can change-over the two, "high" and "low" stages, and the main gearshift portion 113 can shift the four stages on the forward side, so that one reverse stage and eight forward stages can be shifted as a whole. The engaging operations of the clutches and the brakes for setting the gearshift stages are tabulated in FIG. 3.

In FIG. 3, mark ○ indicates an engaged state, mark ● indicates an engaged state in an engine braking mode, and a blank indicates a released state. As indicated by ⊙, however, only the first, second, third, fourth and fifth stages are used in addition to the neutral and reverse positions here.

As seen from FIG. 3, a downshift from the third speed stage to the second speed stage is a clutch-to-clutch gearshift which is based on the release of the brake B2 (corresponding to a "higher-speed-stage side clutch") and the engagement of the brake B3 (corresponding to a "lower-speed-stage side clutch").

As illustrated in FIG. 2, each of the clutches and brakes is engaged or released in such a way that a solenoid valve or a linear solenoid included in a hydraulic pressure controller is driven on the basis of a command issued by a computer 30. Signals from various sensors 40 are inputted to the computer 30. The signals include, not only basic signals, for example, a vehicle speed signal from a vehicle speed sensor 41 (the signal of the r.p.m. of the out put shaft), a throttle opening signal from a throttle sensor 42 (the signal of the opening degree of an accelerator pedal), a pattern select signal from a pattern select switch 43 (a select signal for any of a drive with importance attached to power, a drive with importance attached to fuel consumption, etc. as selected by the driver of the motor vehicle), a shift position signal from a shift position switch 44, and a foot rake signal from a brake switch 45, but also the signal of the r.p.m. of the input shaft 130 from a transmission input-r.p.m. sensor 46 (hereinbelow, the r.p.m. shall be termed "turbine r.p.m. NT").

Incidentally, regarding the hydraulic pressure control for releasing the brake B2 and the hydraulic pressure control for engaging the brake B3, various methods have hitherto been known and shall be omitted from detailed description. Here, the controls are performed in such a way that the duty ratios of duty solenoids (linear solenoids) are adjusted by the computer 30.

Next, the contents of the controls will be described in detail.

Figure 4:
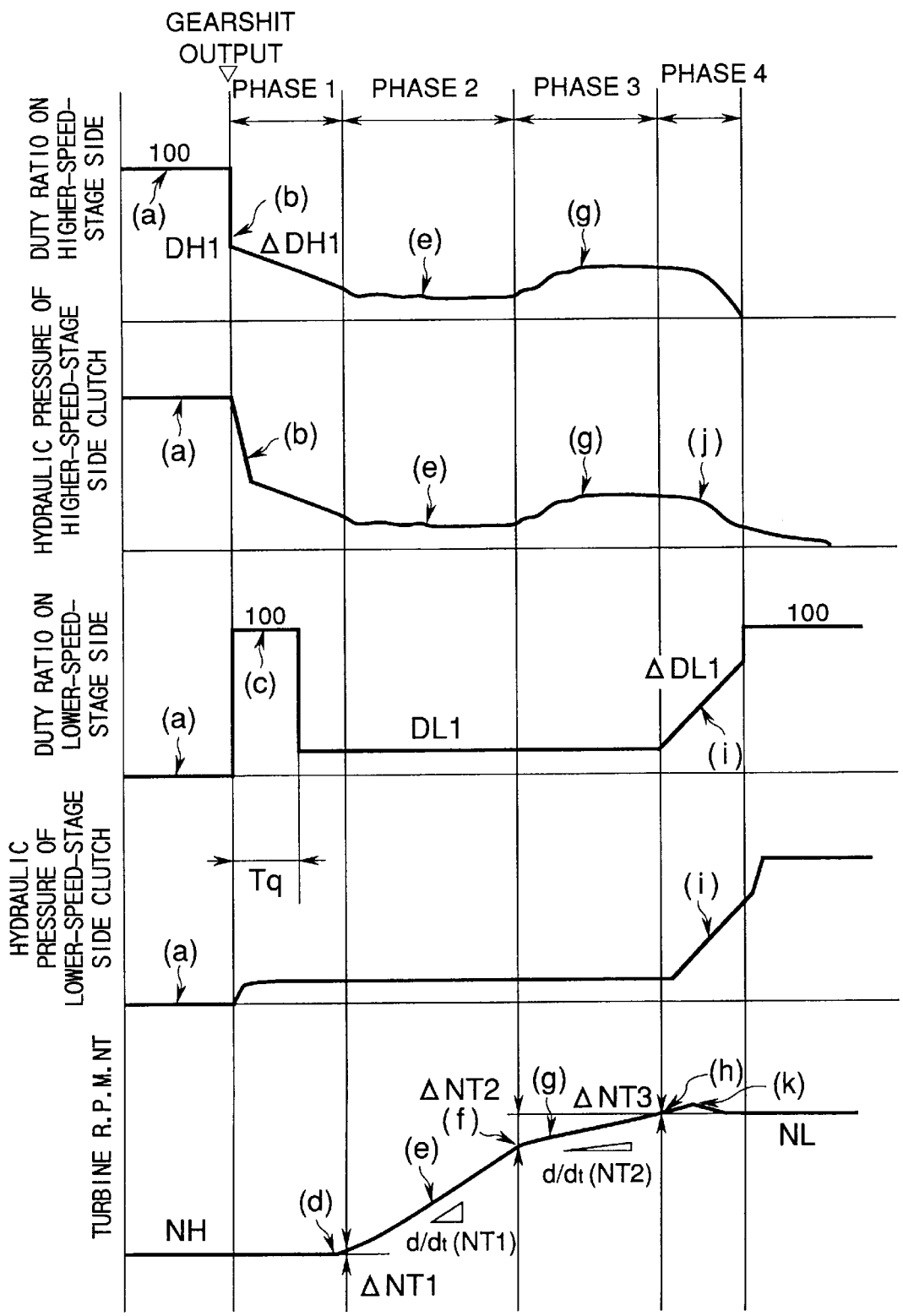
FIG. 4 is a time chart showing the control characteristics of the automatic transmission.

FIG. 4 is a time chart showing the contents of a control operation in the first aspect of performance. The time chart illustrates the correlations among the duty ratio which is outputted to the duty solenoid for the hydraulic pressure control of the higher-speed-stage side clutch, the hydraulic pressure of the higher-speed-stage side clutch, the duty ratio which is outputted to the duty solenoid for the hydraulic pressure control of the lower-speed-stage side clutch, the hydraulic pressure of the lower-speed-stage side clutch, and the turbine r.p.m. NT (=input r.p.m. of the transmission). In this case, a line pressure of 100% is supplied to the corresponding clutch for the duty ratio of 100%, whereas the hydraulic pressure of the corresponding clutch is drained for the duty ratio of 0%.

A part indicated by (a) at the left end of FIG. 4 illustrates the state of the third speed stage in which the higher-speed-stage side clutch is fully or completely engaged owing to the higher-speed-stage side duty ratio of 100%, and in which the lower-speed-stage side clutch is fully released owing to the lower-speed-stage side duty ratio of 0%. In a case where the power-ON down shift to the second speed stage is to be effected under the illustrated state, the duty ratio on the higher-speed-stage side is first lowered to a value DH1 of about 50% in compliance with a downshift command (the generation of a gearshift output), thereby to skip down the hydraulic pressure of the higher-speed-stage side clutch [refer to a part indicated by (b) in the FIG. 4].

At the same time, the duty ratio on the lower-speed-stage side is set at 100%, thereby to implement the "first quick fill (FQF)" of the lower-speed-stage side clutch [refer to a part indicated by (c) in the figure]. The phrase "first quick fill" signifies an operation in which oil is quickly introduced in the fully open state of the clutch in order to fill up the clearance thereof until this clutch begins its frictional engagement. Here, the FQF is implemented for a predetermined time period Tq which is set by a timer. When the FQF has ended, the duty ratio on the lower-speed-stage side is once dropped to such a level DL1 that the lower-speed-stage side clutch does not have a transmission torque capacity.

The higher-speed-stage side duty ratio having the value DH1 is gradually lowered at a constant rate ΔDH1until the turbine r.p.m. NT begin to rise, thereby to gradually lower (sweep down) the hydraulic pressure of the higher-speed-stage side clutch. Further, when the turbine r.p.m. NT have begun to rise owing to decrease in the transmission torque capacity of the higher-speed-stage side clutch [refer to a part indicated by (d) in the figure], the rise rate of the turbine r.p.m. NT is monitored as the second stage of the control.

The timing of the beginning of the rise of the turbine r.p.m. NT is detected in accordance with the fact that the turbine r.p.m. NT which has been kept at the synchronous r.p.m. NH of the higher speed stage rises by ΔNT1 from the synchronous r.p.m. NH, and that the rise rate of the turbine r.p.m. NT is a predetermined value or greater. When the beginning of the rise of the turbine r.p.m. NT has been detected, the hydraulic pressure of the higher-speed-stage side clutch is subjected to a feedback control till a certain control stage so that the rise rate of the turbine r.p.m. NT may become a predetermined value d/dt(NT1) [refer to a part indicated by (e) in the figure]. That is, the duty ratio on the higher-speed-stage side is set while the rise rate of the turbine r.p.m. NT is being continuously monitored.

When, in due course, the turbine r.p.m. NT rising at the constant rate d/dt(NT1) has reached a value which is a predetermined amount ΔNT2 smaller than the synchronous speed NL of the lower speed stage [refer to a part indicated by (f) in the figure], the rise rate of the turbine r.p.m. NT is slightly moderated (or altered in the direction of making a gradient gentler), and the hydraulic pressure of the higher-speed-stage side clutch is subjected to a feedback control so that the rise rate may become d/dt(NT2) [refer to apart indicated by (g) in the figure]. Here, d/dt(NT1)>d/dt(NT2) holds. As a result, the turbine r.p.m. NT arrive near the synchronous r.p.m. NL of the lower speed stage K10 very gently.

The arrival of the turbine r.p.m. NT near the synchronous r.p.m. NL of the lower speed stage is detected in accordance with the fact that the deviation between the turbine r.p.m. NT and the lower-speed-stage synchronous r.p.m. NL has fallen within a plus predetermined value ΔNT3, ΔNT3 being close to zero [refer to a part indicated by (h) in the figure].

Upon the detection that the turbine r.p.m. NT have arrived near the synchronous r.p.m. NL of the lower speed stage, the duty ratio on the lower-speed-stage side is brought to a constant change rate ΔDL1, thereby to sweep up the hydraulic pressure of the lower-speed-stage side clutch [refer to a part indicated by (i) in the figure]. In addition, the hydraulic pressure of the higher-speed-stage side clutch is subjected to a feedback control so as to keep (the rise rate of) the turbine r.p.m. NT [refer to a part indicated by (j) in the figure].

Finally, the point of time at which the turbine r.p.m. NT have equalized to the synchronous r.p.m. NL of the lower speed stage, and at which the duty ratios on the lower-speed-stage side and on the higher-speed-stage side have become 100% and 0%, respectively, is judged as the time at which the changeover between the clutches has ended. At this stage of the control, the duty ratios on the lower-speed-stage side and on the higher-speed-stage side are respectively fixed at 100% and 0%, whereupon the downshift control is ended.

Next, the contents of the gearshift control will be described in conjunction with flow charts.

Here, the respective stages of the control shall be named "phases 1~4".

As indicated in FIG. 4, the phase 1 signifies the control stage which extends since the beginning of the gearshift until the higher-speed-stage side clutch begins to slide. The phase 2 signifies the control stage in which the hydraulic pressure of the higher-speed-stage side clutch is subjected to the feedback control so that the rise rate of the turbine r.p.m. NT may become the first predetermined value d/dt(NT1). The phase 3 signifies the control stage in which the hydraulic pressure of the higher-speed-stage side clutch is subjected to the feedback control so that the rise rate of the turbine r.p.m. NT may become the second predetermined value d/dt(NT2). The phase 4 signifies the final control stage which extends until the higher-speed-stage side clutch is fully or completely released, whereas the lower-speed-stage side clutch is fully engaged.

Figure 5:
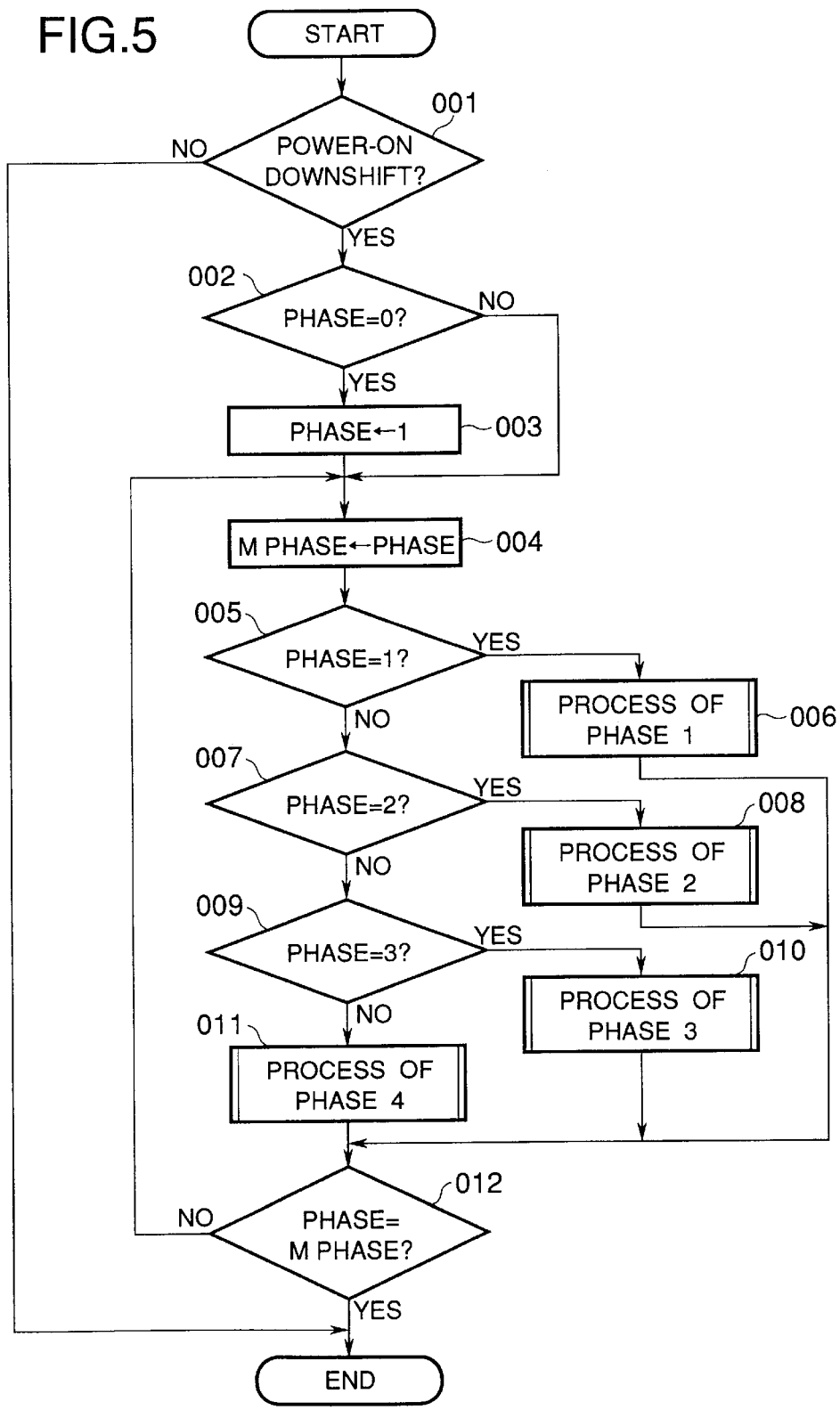
FIG. 5 is a flow chart of the control of a first aspect of performance which is executed in a computer for controlling the automatic transmission.

FIG. 5 is the flow chart showing the entire gearshift control. Incidentally, symbol "phase" in the flow of the control sometimes denotes a phase flag.

In the flow, whether or not the power-ON downshift is requested is judged at the first step 001. The downshift request is outputted in any of a well-known flow for judging gearshifts, etc. (not shown). By way of example, whether or not the downshift from the third speed stage to the second speed stage is to be effected is judged depending upon whether or not the drive state of the motor vehicle at the current time has traversed a "third speed stage→second speed stage" downshift line. The downshift line is set on a map which is formed by the opening degree of a throttle valve and the speed of the vehicle. Subject to "NO" as the judgement at the step 001, the routine of the gearshift control is directly ended.

Subject to "YES" as the judgement at the step 001, whether or not phase=0 (not being under gearshift) holds is judged at a step 002. Before the beginning of the downshift, phase=0 holds owing to the last processing of the gear shift control, and hence, the step 002 is followed by a step 003 at which phase=1 is established. In a case where the judgement at the step 002 is "NO", that is, where any of phase=1~phase=4 holds, the step 003 is passed. At a step 004 thus succeeding to the step 002 or 003, the value of the phase at the current time ("1" at the first cycle of the routine) is entered into a flag "mphase".

Thereafter, the subroutine processes of the respective phases are executed. More specifically, for phase=1, the control flow advances from a step 005 to a step 006, at which the subroutine process of the phase 1 is executed. For phase=2, the control flow advances from a step 007 to a step 008, at which the subroutine process of the phase 2 is executed. For phase=3, the control flow advances from a step 009 to a step 010, at which the subroutine process of the phase 3 is executed. Besides, for phase=4, the subroutine process of the phase 4 is executed at a step 011. After the process of each of the phases has been executed, it is judged at a step 012 whether or not the current phase is the "mphase" entered at the step 004, that is, whether or not the value of the phase flag has changed. When the judgement at the step 012 is "NO" (that is, the phase value has changed), the control flow is returned to the step 004, and the process of the pertinent phase is executed. On the other hand, when the judgement at the step 012 is "YES" (that is, the phase value has not changed), the routine is ended.

Figure 6:
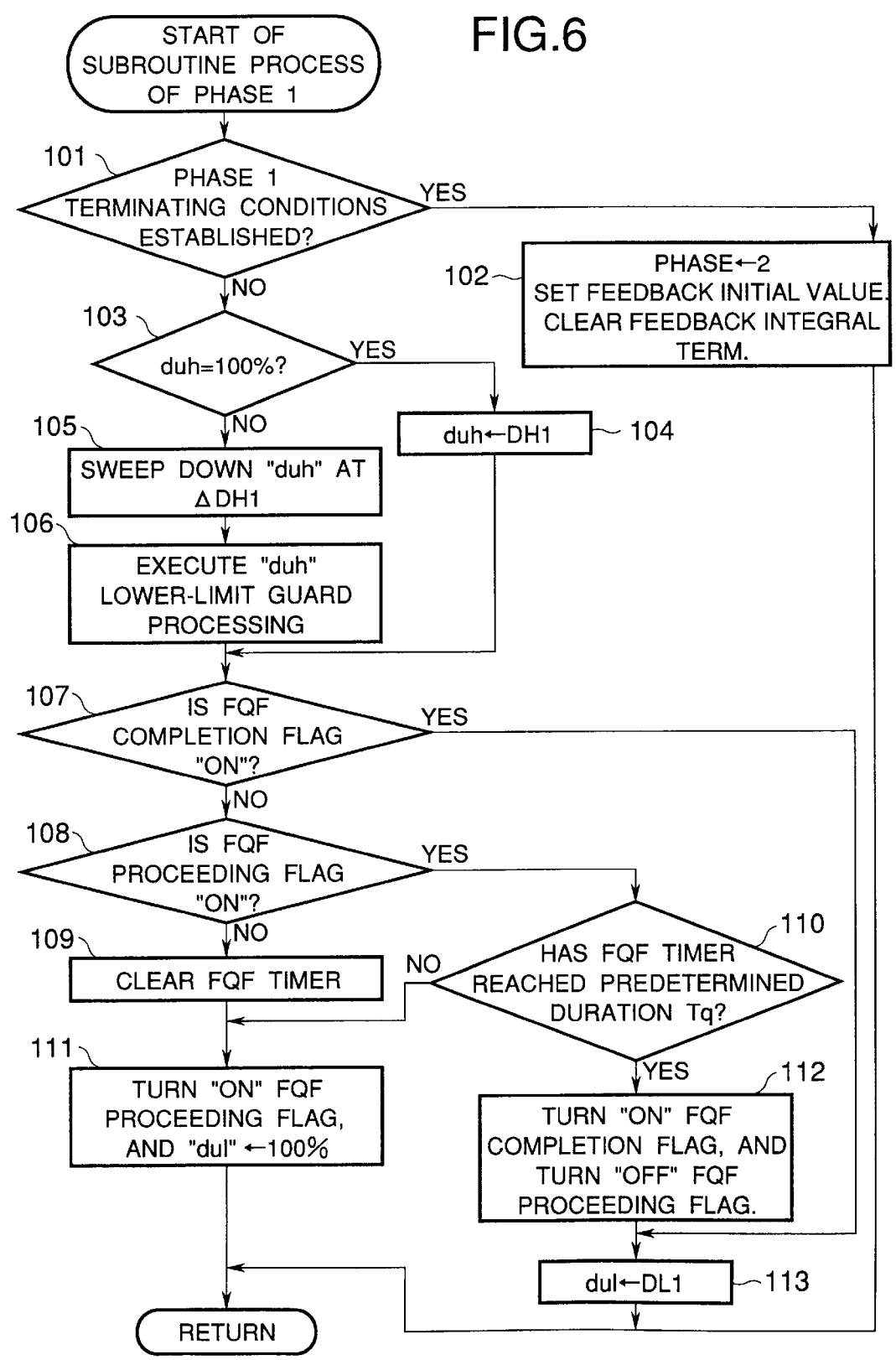
FIG. 6 is a flow chart of the subroutine of phase 1which is included in the flow chart of FIG. 5.

FIG. 6 illustrates the flow chart of the subroutine process of the phase 1.

In this process, whether or not conditions for terminating the phase 1 are satisfied is first judged at a step 101. The termination of the phase 1 is decided in accordance with the following two conditions:

(1) (Turbine r.p.m. NT—Synchronous r.p.m. NH of Higher speed stage)>Predetermined value ΔNT1
(2) The rise rate of the turbine r.p.m. NT is the predetermined value or greater.

If the judgement at the step 101 is "YES" [corresponding to the part (d) in FIG. 4], the processing of a step 102 is executed, and if the judgement is "NO", the processing of steps 103 et seq. is executed. At the step 102, the phase is set at "2", the duty ratio being outputted is set as the initial value of the feedback control which is performed in the phase 2, and the feedback integral term of the feedback control is cleared.

Among the processing of the steps 103 et seq., the steps 103~106 concern the control of the duty ratio "duh" of the hydraulic pressure of the higher-speed-stage side clutch. In the first cycle of the subroutine process, the duty ratio "duh" is 100%, and hence, the step 103 is followed by the step 104, at which the duty factor "duh" on the higher-speed-stage side is skipped down to the value DH1. In or after the next cycle, the step 103 is followed by the step 105, at which the duty factor "duh" on the higher-speed-stage side is swept down at the constant rate ΔDH1. On that occasion, lower-limit guard processing is executed at the step 106 so that the duty ratio "duh" may be prevented from lowering excessively. Thereafter, the control flow of the subroutine process advances to the step 107.

The steps 107~113 concern the control of the duty factor "dul" of the hydraulic pressure of the lower-speed-stage side clutch. The step 107 serves to decide if a "first quick fill" (hereinbelow, abbreviated to "FQF") completion flag is "ON", while the step 108 serves to decide if a "FQF proceeding" flag is "ON" (that is, if the FQF is being implemented). In the first cycle, the FQF has not been implemented yet, and hence, the control flow advances along the steps 107→108→109. Here at the step 109, an FQF timer is cleared and started. At the step 111 succeeding to the 12 step 109, the FQF proceeding flag is turned "ON", and the duty ratio "dul" on the lower-speed-stage side is set at 100%, thereby to initiate the operation of the FQF.

In the next cycle of the process, since the judgement of the step 108 becomes "YES", the control flow advances to the step 110. Unless the value of the FQF timer reaches the predetermined time period Tq, the step 110 is followed by the step 111 so as to continue the FQF operation. If the predetermined time period Tq has lapsed, the step 110 is followed by the step 112, at which the FQF completion flag is turned "ON", and the FQF proceeding flag is turned "OFF". At the step 113 succeeding to the step 112, the duty ratio "dul" on the lower-speed-stage side is once dropped to the value DL1. In the still next cycle of the process, since the FQF completion flag is "ON", the judgement of the step 107 becomes "YES". Accordingly, the step 107 is directly followed by the step 113, at which the lower-speed-stage side duty ratio dul=DL1 is fixed. This value DL1 is at the level at which the lower-speed-stage side clutch does not have the transmission torque capacity.

Figure 7:
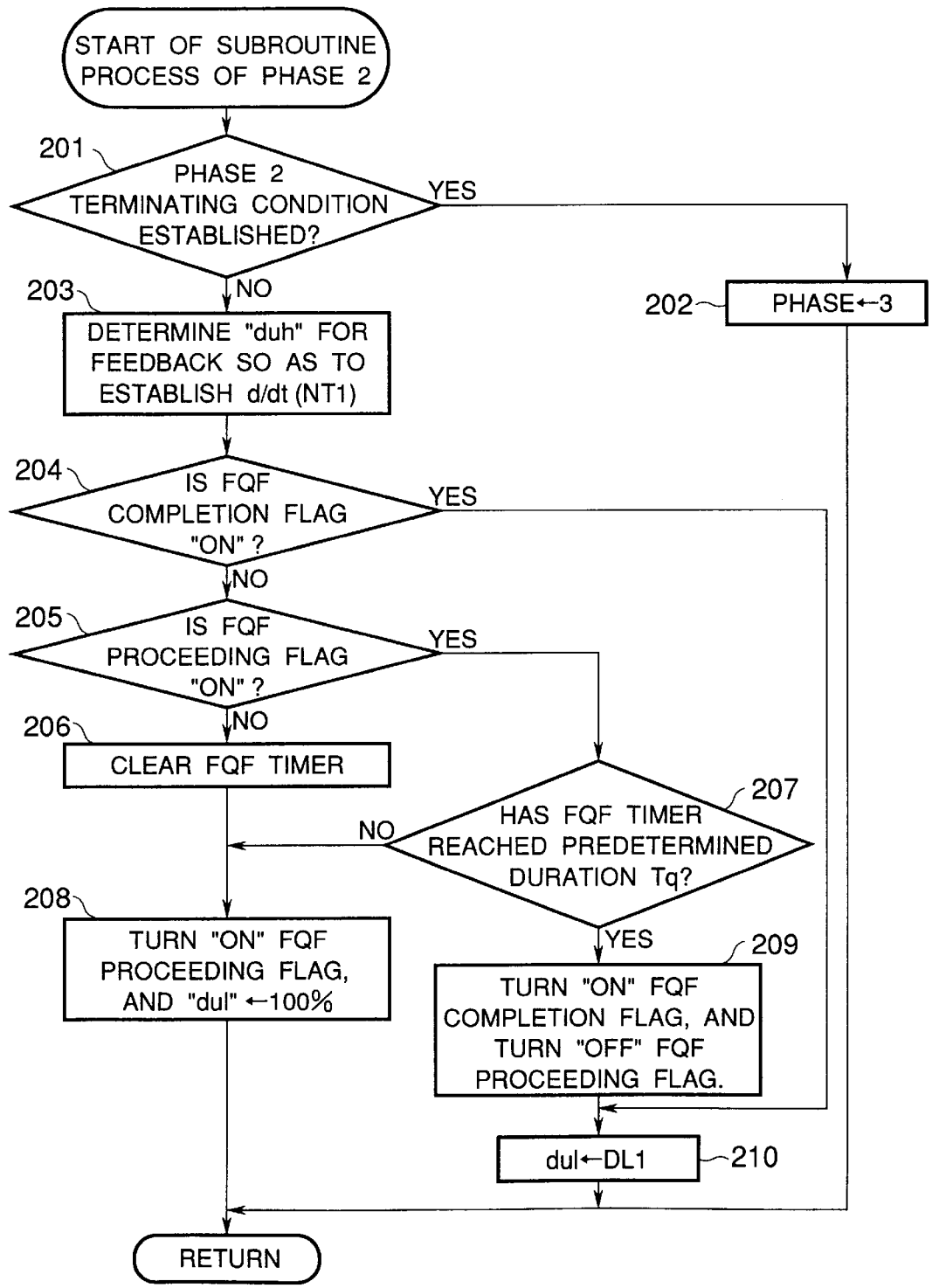
FIG. 7 is a flow chart of the subroutine of phase 2which is included in the flow chart of FIG. 5.

FIG. 7 illustrates the flow chart of the subroutine process of the phase 2.

In this process, whether or not a condition for terminating the phase 2 is satisfied is first judged at a step 201. The termination of the phase 2 is decided in accordance with the following condition:

(1) (Synchronous r.p.m. NL on Lower-speed-stage side— Turbine r.p.m. NT)<Predetermined value ΔNT2

Here, the value ΔNT2 shall be the map value of the actual rise rate of the turbine r.p.m. NT.

If the judgement at the step 201 is "YES", the processing of a step 202 is executed, and if the judgement is "NO", the processing of steps 203 et seq. is executed. At the step 202, the phase is set at "3".

Among the processing of the steps 203 et seq., the step 203 concerns the control of the duty ratio "duh" of the hydraulic pressure of the higher-speed-stage side clutch. At this step 203, the duty ratio "duh" on the higher-speed-stage side for the feedback control is determined so that the rise rate of the turbine r.p.m. NT may become the predetermined value d/dt(NT1). Besides, the steps 204~210 concern the control of the duty ratio "dul" of the lower-speed-stage side clutch, and they execute processing similar to that of the phase 1. That is, if the "first quick fill (FQF)" has not been completed yet, it is implemented, and if the FQF has been completed, the value DL1 is kept as the duty factor "dul" on the lower-speed-stage side.

Figure 8:
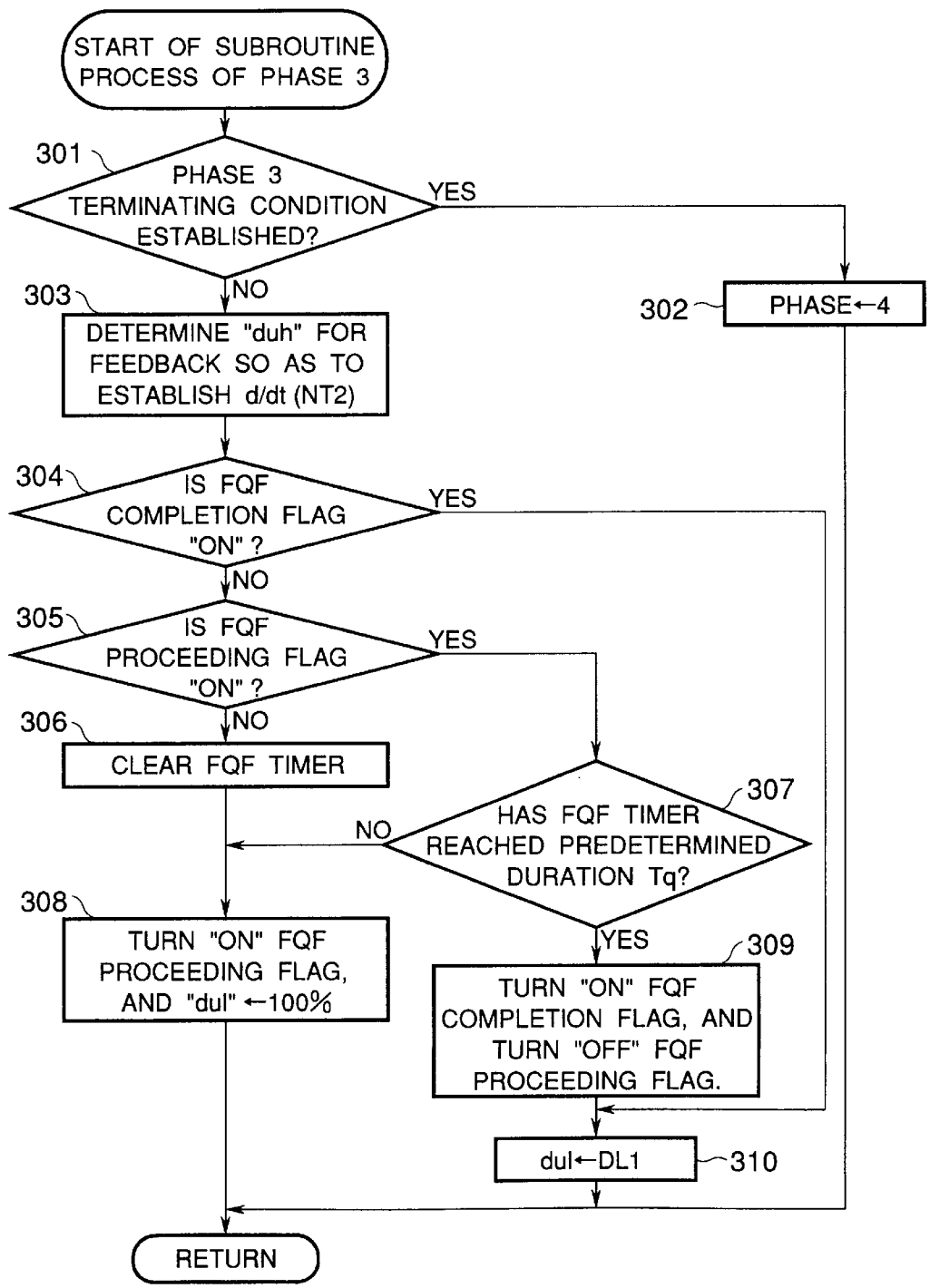
FIG. 8 is a flow chart of the subroutine of phase 3which is included in the flow chart of FIG. 5.

FIG. 8 illustrates the flow chart of the subroutine process of the phase 3.

In this process, whether or not a condition for terminating the phase 3 is satisfied is first judged at a step 301. The termination of the phase 3 is decided in accordance with the following condition:

(1) (Synchronous r.p.m. NL on Lower-speed-stage side— Turbine r.p.m. NT)<Predetermined value ΔNT3

Here, the value ΔNT3 is a plus constant which is close to zero, and which is used for verifying the fact that the turbine r.p.m. NT has come near to the synchronous r.p.m. NL on the lower-speed-stage side.

If the judgement at the step 301 is "YES", the processing of a step 302 is executed, and if the judgement is "NO", the processing of steps 303 et seq. is executed. At the step 302, the phase is set at "4".

Among the processing of the steps 303 et seq., the step 303 concerns the control of the duty ratio "duh" of the hydraulic pressure of the higher-speed-stage side clutch. At this step 303, the duty ratio "duh" on the higher-speed-stage side for the feedback control is determined so that the rise rate of the turbine r.p.m. NT may become the predetermined value d/dt(NT2). Thus, the rise rate of the turbine r.p.m. NT becomes smaller than the value d/dt(NT1) held till then. Besides, the steps 304~310 concern the control of the duty ratio "dul" of the lower-speed-stage side clutch, and they execute processing similar to that of the phase 1. That is, if the "first quick fill (FQF)" has not been completed yet, it is implemented, and if the FQF has been completed, the value DL1 is kept as the duty ratio "dul" on the lower-speed-stage side.

Figure 9:
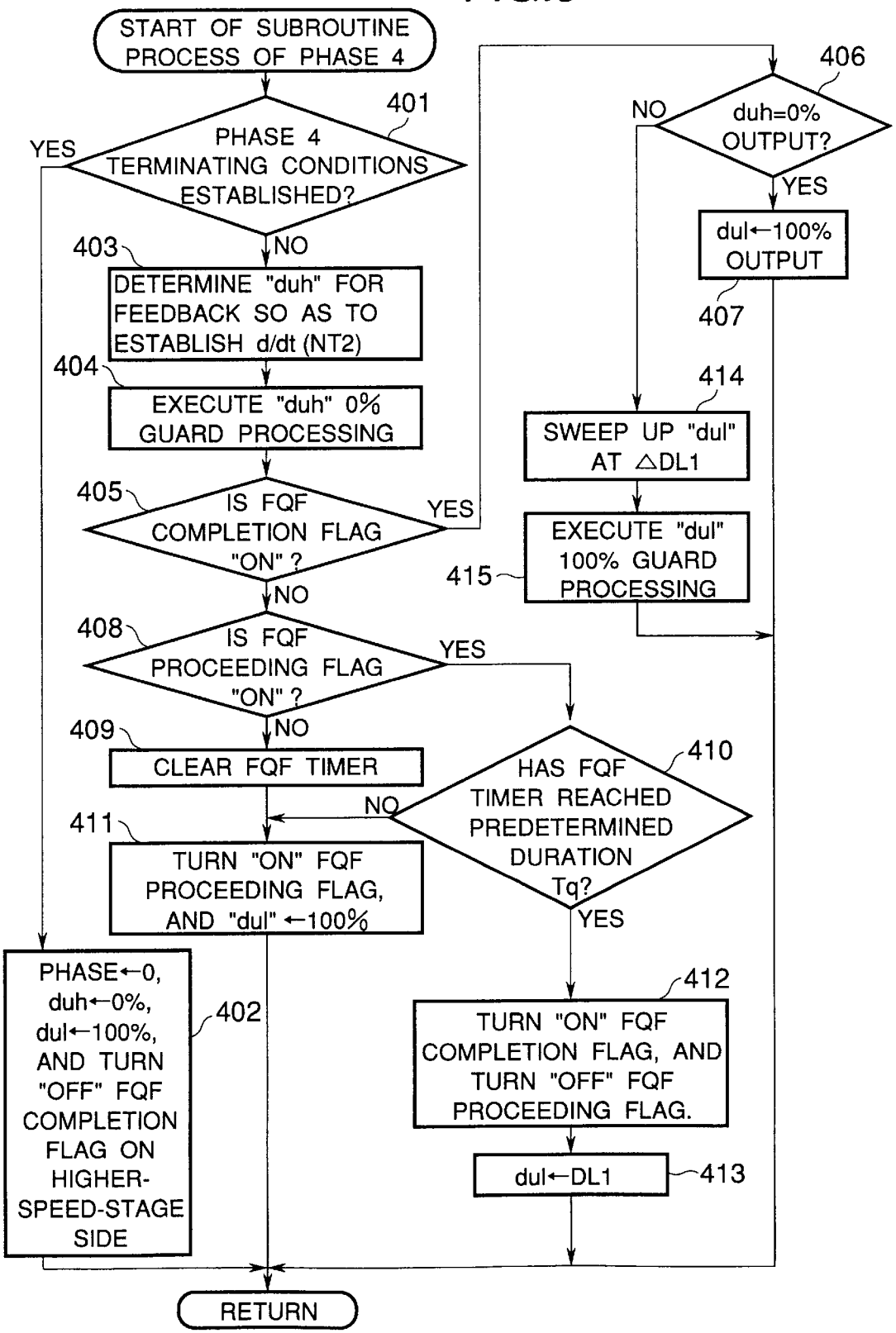
FIG. 9 is a flow chart of the subroutine of phase 4which is included in the flow chart of FIG. 5.

FIG. 9 illustrates the flow chart of the subroutine process of the phase 4.

In this process, whether or not conditions for terminating the phase 4 are satisfied is first judged at a step 401. The termination of the phase 4 is decided in accordance with the following conditions:

(1) (Turbine r.p.m. NT—Synchronous r.p.m. NL on Lower-speed-stage side)<Predetermined value ΔNT4

Here, the value ΔNT4 is a constant which is close to zero.

(2) 0% is outputted as the duty ratio on the higher-speed-stage side.

(3) 100% is outputted as the duty ratio on the lower-speed-stage side.

If the judgement at the step 401 is "YES", the processing of a step 402 is executed, and if the judgement is "NO", the processing of steps 403 et seq. is executed. At the step 402, the phase is set at "0" as processing for ending the gearshift. In addition, the duty ratio "duh" on the higher-speed-stage side is fixed at 0%, while the duty ratio "dul" on the lower-speed-stage side is fixed at 100%. Besides, the FQF completion flag of the higher-speed-stage side clutch is turned "OFF" (that is, the FQF completion flag on the side on which the hydraulic pressure has been drained is turned "OFF"). Incidentally, the FQF completion flag on the lower-speed-stage side is continuously held "ON" during the time period during which the automatic transmission is not under gearshift.

Among the processing of the steps 403 et seq., the steps 403 and 404 concern the control of the duty ratio "duh" of the higher-speed-stage side clutch. Here, as in the phase 3, the duty ratio "duh" on the higher-speed-stage side for the feedback control is determined on the basis of the turbine r.p.m. NT so that the rise rate of this turbine r.p.m. NT may become the predetermined value d/dt(NT2). Incidentally, the feedback control may well be performed so as to establish the predetermined value d/dt(NT3), provided that d/dt(NT3) <d/dt(NT2) is fulfilled. When the feedback control similar to that of the phase 3 is performed at this control stage, the duty ratio "duh" on the higher-speed-stage side inevitably sticks onto the decreasing side thereof (for the reason that, with the higher-speed-stage side clutch held engaged, the turbine r.p.m. NT is likely to become lower than the synchronous r.p.m. NL of the lower speed stage). Accordingly, the higher-speed-stage side clutch is prevented from reverting onto the engagement side thereof, and the duty ratio "duh" is decreased without fail. Incidentally, the duty ratio "duh" on the higher-speed-stage side may possibly become minus when the decrease thereof is left intact. At the step 404, therefore, the duty ratio "duh" on the higher-speed-stage side is guarded at 0%. Thus, the duty ratio "duh" on the higher-speed-stage side is finally converged to 0%.

The steps 405~415 concern the duty ratio of the lower-speed-stage side clutch. Among them, the steps 405 and 408~413 serve to execute processing similar to that of the phase 1. More specifically, if the "first quick fill (FQF)" has not been completed yet, it is implemented, and when the FQF has been completed, the duty ratio "dul" on the lower-speed-stage side is dropped to the value DL1. The gearshift control is now in the phase 4. Therefore, when the FQF is completed (or in the case where it has already been completed), the control flow advances (via the steps 405→406) to the step 414, at which the duty ratio "dul" on the lower-speed-stage side is gradually raised (swept up) from the value DL1 at the constant rate ΔDL1. Subsequently, the duty ratio "dul" is guarded at 100% at the step 415. The operation of sweeping up the duty ratio "dul" on the lower-speed-stage side is continued along the steps 406→414→415 until the duty ratio "duh" on the higher-speed-stage side becomes 0%. When the duty ratio "duh" on the higher-speed-stage side has become 0%, the step 406 is followed by the step 407, at which the duty ratio "dul" on the lower-speed-stage side is forcibly set at 100%.

In this manner, in the phase 4, even after the turbine r.p.m. NT has arrived near the synchronous r.p.m. NL of the lower-speed-stage side, the duty ratio "duh" on the higher-speed-stage side is determined by the feedback based on (the rise rate of) the turbine r.p.m. NT, so that the hydraulic pressure of the lower-speed-stage side clutch can rise gradually. It is therefore permitted to smoothly switch the hydraulic pressures. Accordingly, the gearshift shock can be relieved.

By the way, the "first quick fill" for the lower-speed-stage side clutch as stated before may be implemented at any control stage of the phases 1 thru 4. Therefore, if the FQF is completed without fail in the phase 1 or phase 2, the processing steps relevant to the FQF may well be deleted from the succeeding subroutine, though they are included in the subroutines of all the phases in the first aspect of performance thus far described.

Next, the contents of the control of the second aspect of performance will be described.

Figure 10:
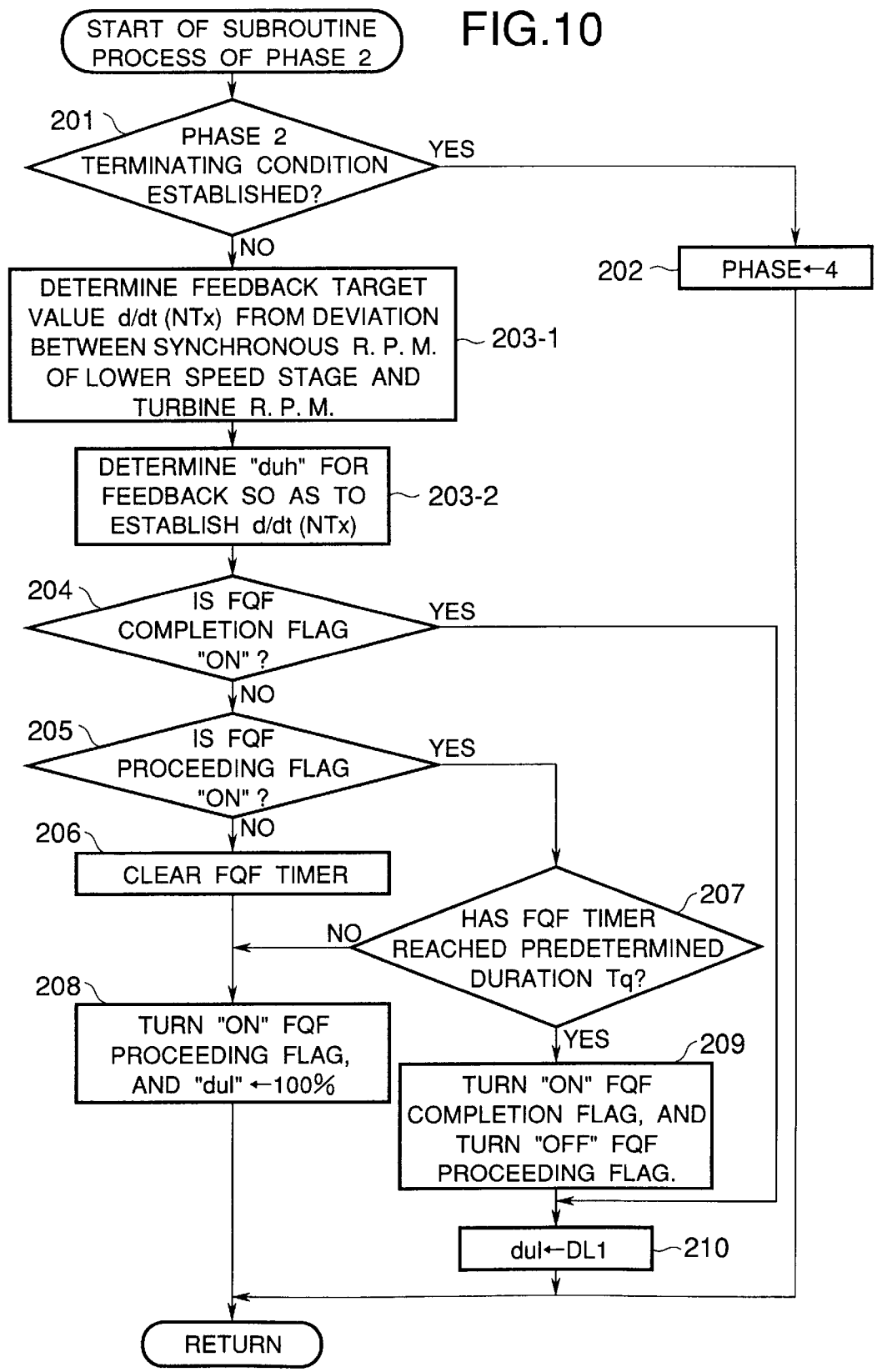
FIG. 10 is a flow chart of a subroutine which is included in a control flow in the second aspect of performance of the present invention.

Although the feedback control is performed at the two control stages of the phases 2 and 3 in the control of the first aspect of performance, it is performed by the processing of only one control stage in the second aspect of performance. That is, the processing of the phases 2 and 3 in FIG. 7 is omitted, and the processing of the phase 2 is somewhat altered as indicated in FIG. 10. The others are the same as in the foregoing aspect of performance.

FIG. 10 illustrates a flow chart in which the alterations are made in the foregoing flow of the phase 2 in FIG. 7.

The differences of the flow chart from FIG. 7 are that the step 203 in FIG. 7 is replaced with steps 203-1 and 203-2, and that the value "3" is replaced with a value "4" as the value which is substituted into the phase at the step 202.

Further, the condition for deciding the termination at the step 201 is made the same as the condition of the step 301 in the phase 3 as indicated in FIG. 8.

Referring to FIG. 10, at the step 203-1, a feedback target value d/dt(NTx) is determined from the deviation between the synchronous r.p.m. NL of the lower speed stage and the turbine r.p.m. NT. Here, the value d/dt(NTx) is set larger as the deviation between the synchronous r.p.m. NL of the lower speed stage and the turbine r.p.m. NT is larger. Besides, at the step 203-2, the higher-speed-stage side duty ratio "duh" for the feedback control is determined so that the rise rate of the turbine r.p.m. NT may become the target value d/dt(NTx).

Thus, the turbine r.p.m. NT, which changes in the form of a polygonal line in the phases 2 and 3 in the first aspect of performance, can be changed more smoothly, and a torque is also changed smoothly. In particular, the rise rate of the turbine r.p.m. NT is rapid at the beginning of the rise thereof, and it becomes gentler as the synchronous r.p.m. of the lower speed-stage is approached more. Therefore, a gearshift shock at the point of time at which the lower speed stage has been attained can be relieved more.

Next, the contents of the controls of the third and fourth aspects of performance will be described.

Figure 11:
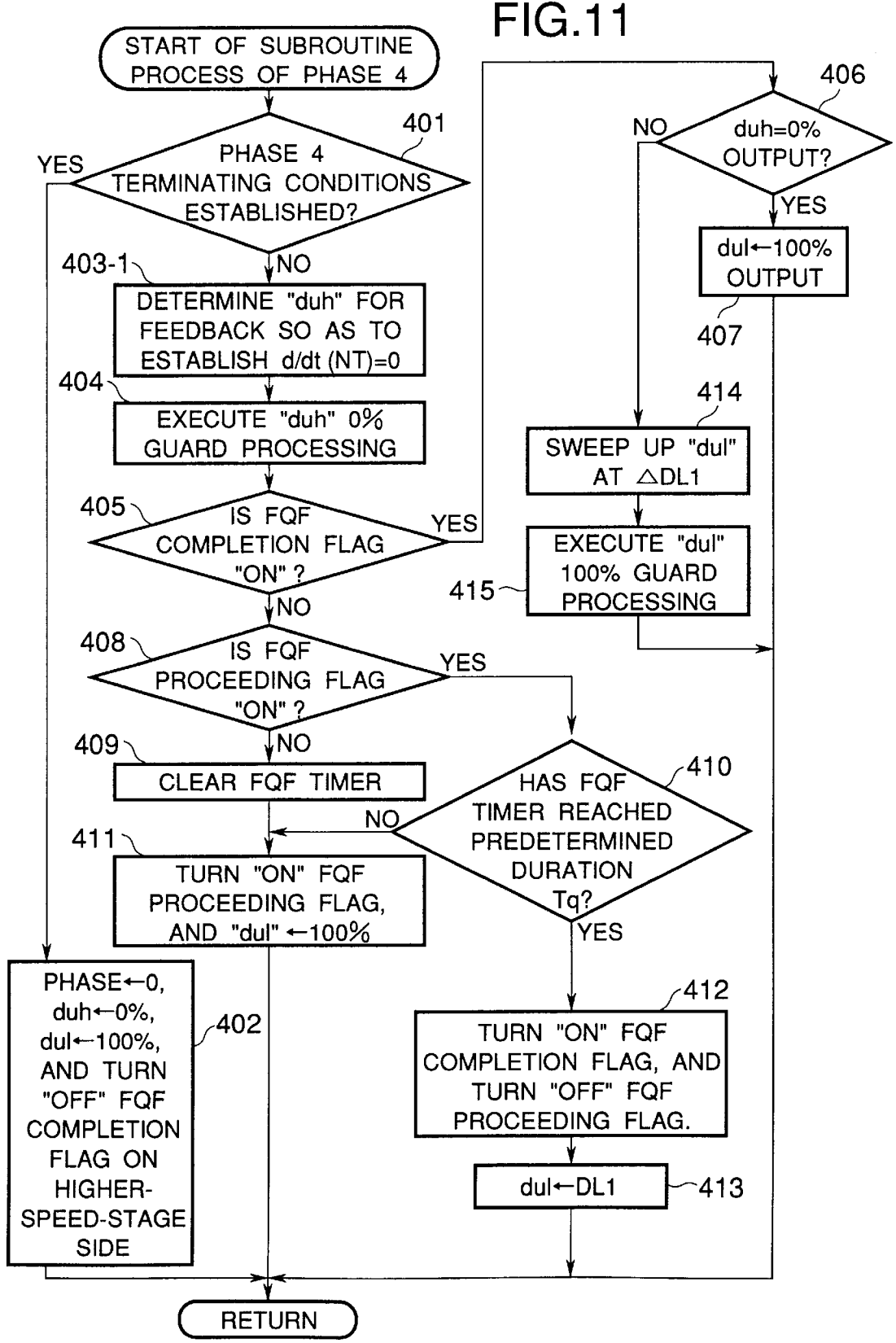
FIG. 11 is a flow chart of a subroutine which is included in a control flow in the third aspect of performance of the present invention.
Figure 12:
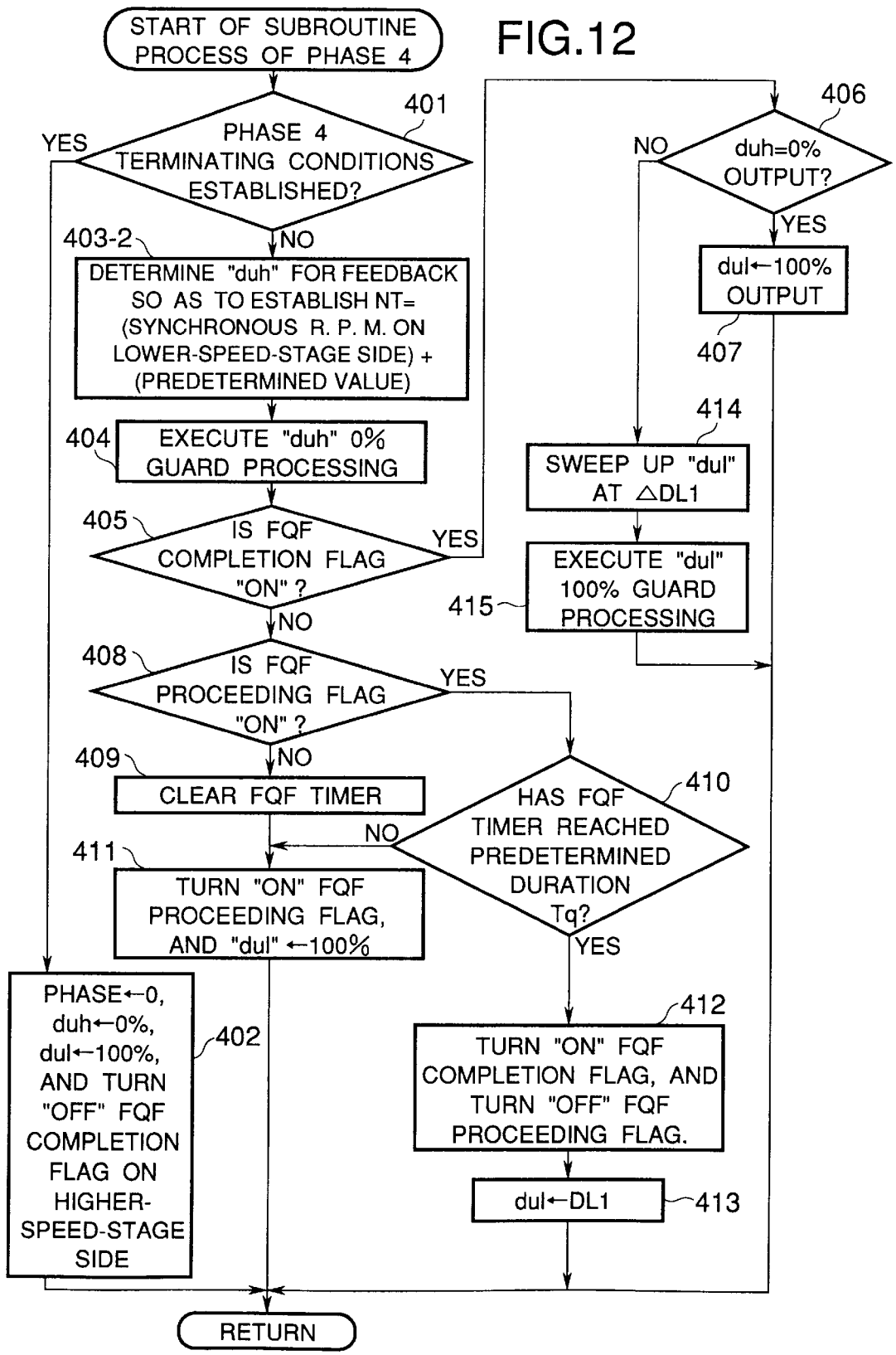
FIG. 12 is a flow chart of a subroutine which is included in a control flow in the fourth aspect of performance of the present invention.

FIG. 11 illustrates a flow chart of the subroutine process of the phase 4 in the third aspect of performance, while FIG. 12 illustrates a flow chart of the subroutine process of the phase 4 in the fourth aspect of performance. The remaining routine is the same as in the first aspect of performance.

The flows of FIGS. 11 and 12 differ from the flow of FIG. 9 in that the step 403 is altered to steps 403-1 and 403-2, respectively. The processing contents of the other steps are identical.

At the step 403-1, the higher-speed-stage side duty factor "duh" for the feedback control is determined on, the basis of the turbine r.p.m. NT so that the rise rate d/dt (NT) thereof may become "0", i. e., so that the turbine r.p.m. NT may not change from a specific value. Thus, the unnecessary rise of the turbine r.p.m. NT at the point of time of the end of the gearshift can be suppressed. On the other hand, at the step 403-2, the higher-speed-stage side duty ratio "duh" for the feedback control is determined so as to establish (Turbine r.p.m. NT)=(Synchronous r.p.m. on Lower-speed-stage side)+(Predetermined value). Thus, the duty ratio "duh" on the higher-speed-stage side can be kept onto the decreasing side thereof more reliably, and the release of the higher-speed-stage side clutch can be actualized quickly (automatically with the feedback control).

Next, the contents of the control of the fifth aspect of performance of the present invention will be described.

The fifth aspect of performance is such that the function of learning for the "first quick fill" of the lower-speed-stage side clutch is added to the contents of the first aspect of performance (as illustrated in FIG. 9). With the added function, a time period which extends since the beginning of the introduction of oil into the lower-speed-stage side clutch until this clutch comes to have a transmission torque capacity, is detected, and a duration for the FQF into the lower-speed-stage side clutch is learnt and corrected on the basis of the detected time period.

Figure 13:
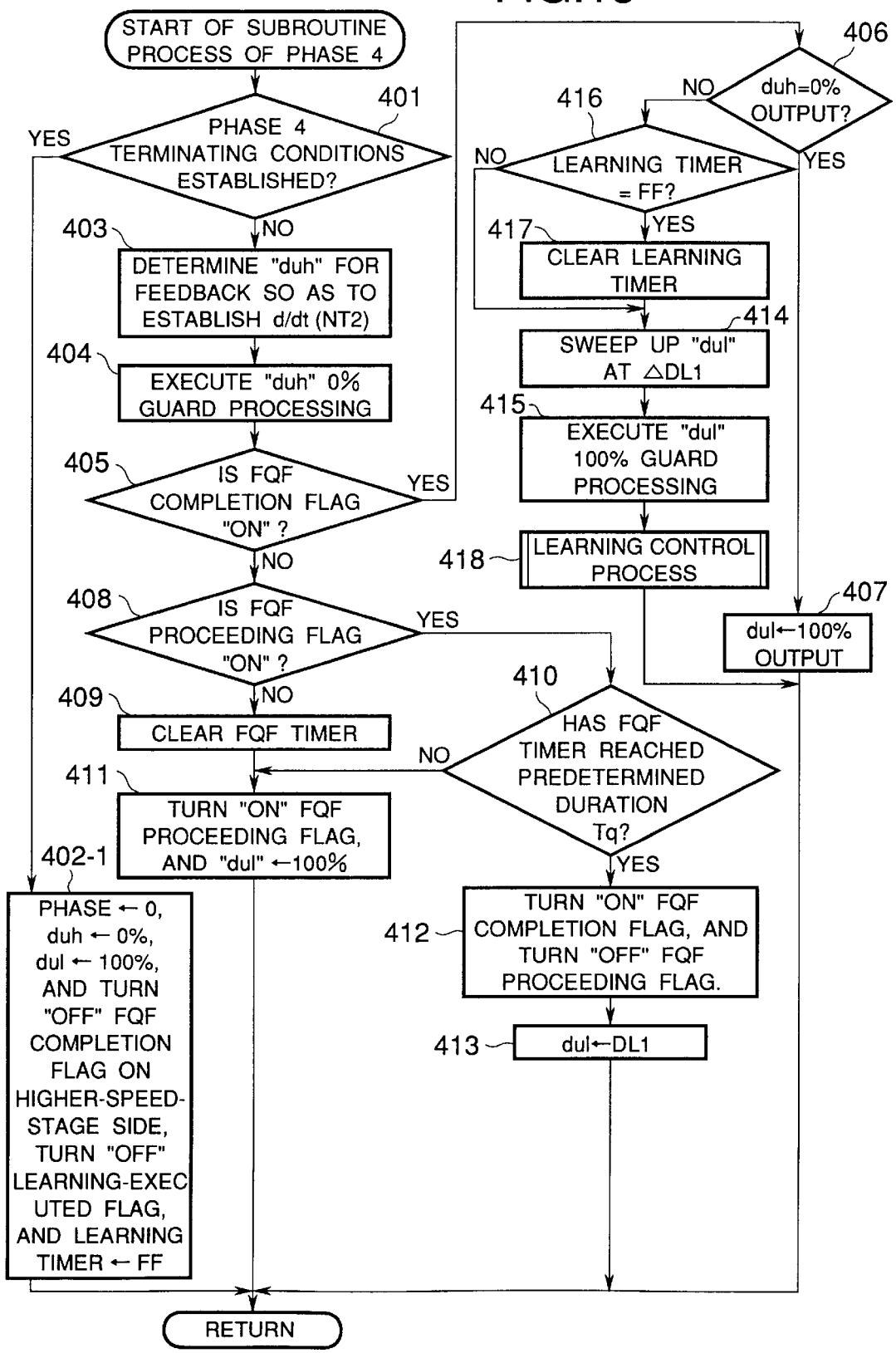
FIG. 13 is a flow chart of a subroutine which is included in a control flow in the fifth aspect of performance of the present invention.

FIG. 13 illustrates a flow chart of the subroutine process of the phase 4 in the fifth aspect of performance. The flow of FIG. 13 differs from the flow of FIG. 9 in that the step 402 in FIG. 9 is altered to a step 402-1, and that steps 416 and 417 are added after the step 406, while a step 418 is also added after the steps 414 and 415.

At the step 402-1, the processing of turning "OFF" a "learning-executed" flag (the processing of establishing an unlearnt state) and the processing of setting a learning timer (to be explained later) at "FF" are added to the processing contents of the step 402 in the first aspect of performance. Besides, the step 416 serves to decide whether or not the learning timer is "FF". In a case where the decision of the step 416 is "YES", since the (value of the) learning timer FF in the last cycle of the subroutine process is left behind, the learning timer FF is cleared at the step 417. After the clearing, the countup of a time period (the learning timer) since the turn-ON of the FQF completion flag is started.

Figure 14:
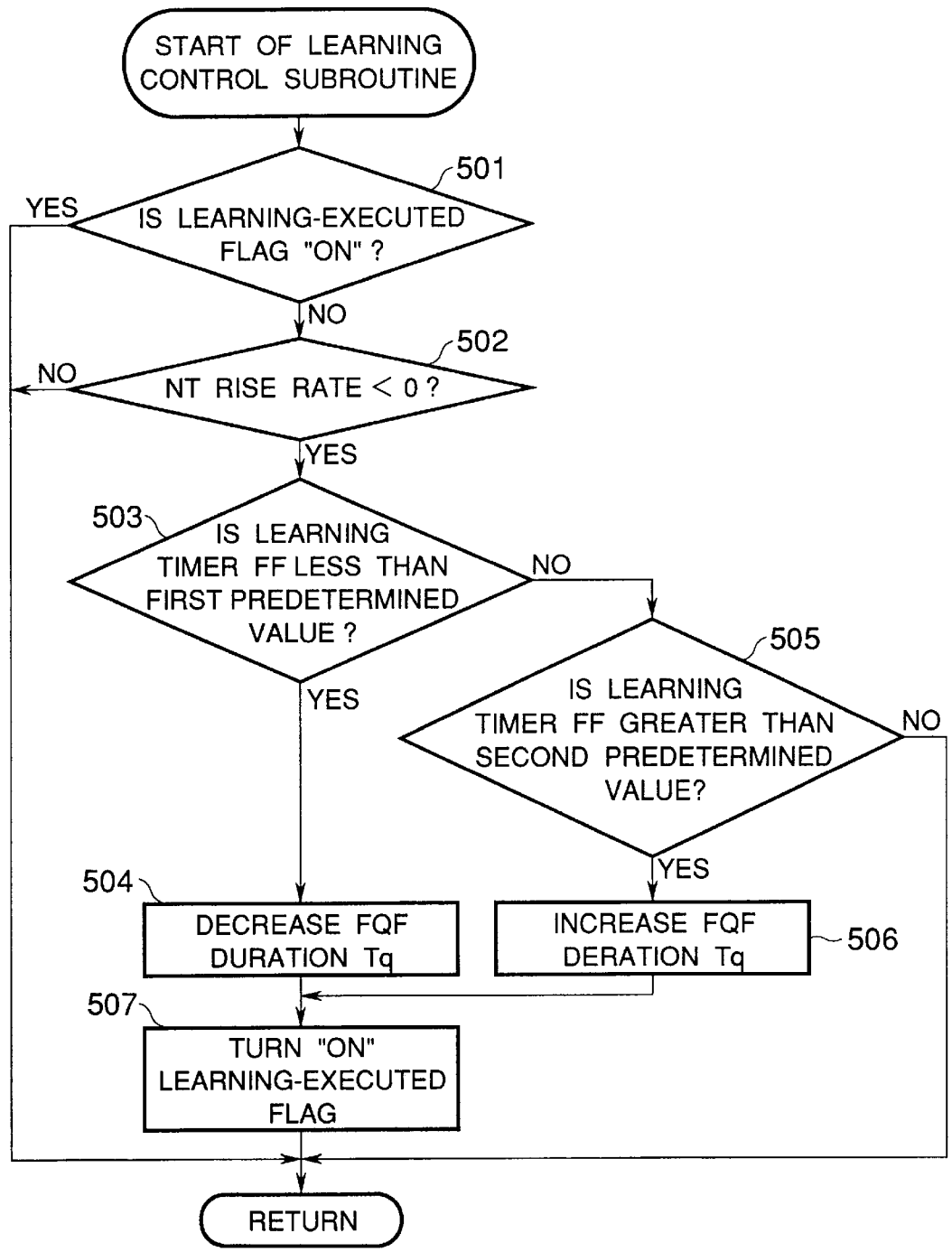
FIG. 14 is a flow chart of a subroutine which is included in the flow of FIG. 13.

At the step 418, a subroutine in FIG. 14 is executed as a learning control process.

In the learning control of FIG. 14, whether or not the learning-executed flag (in the current cycle) is "ON" is decided at a step 501. Subject to "YES" as the decision of the step 501, the flow of the learning control advances to a return step. Subject to "NO" which signifies the unlearnt state, a step 502 serves to decide whether or not the rise rate of the turbine r.p.m. NT is minus (in other words, the lower-speed-stage side clutch has come to have the capacity). If the decision here is "YES", it is judged that the turbine r.p.m. NT has lowered toward the synchronous r.p.m. NL of the lower speed stage [in other words, the point of time (k) in FIG. 4 has been reached] because the lower-speed-stage side clutch has come to have the capacity. At steps 503–506, the FQF duration Tq which has been set till the current time is corrected to increase or decrease in accordance with the learning timer FF counted till then.

The increasing and decreasing corrections have a hysteresis, and the learning timer FF is compared with two, first and second predetermined values (the first predetermined value<the second predetermined value). When the learning timer FF has been decided less than the first predetermined value, the FQF duration Tq is corrected to decrease, and when the learning timer FF has been decided greater than the second predetermined value, the FQF duration Tq is corrected to increase. Thereafter, the learning-executed flag is turned "ON" at a step 507.

Owing to the above, the FQF duration Tq can be learnt and corrected on the basis of the time period (the value of the learning timer FF) which extends since the completion of the FQF until the lower-speed-stage side clutch comes to have the transmission capacity. Therefore, the desired gearshift can be effected even when the various dimensions of the lower-speed-stage side clutch, especially the pack clearance of the clutch, the spring constant of a return spring, etc. are discrepant (or deviated from the standard).

Incidentally, although the case of learning the FQF duration has been exemplified in the fifth aspect of performance, the rise timing of the duty ratio of the lower-speed-stage side clutch (that is, the timing at which the gearshift control enters the phase 4) may well be learnt. Further, the judging condition of the step 502 in FIG. 14 may well be altered to the condition that "(Turbine r.p.m.=Synchronous r.p.m. of Lower speed stage) has continued for a predetermined time period (in other words, the gearshift has been ended without fail)".

As described above, according to the present invention, the hydraulic pressure of a higher-speed-stage side clutch is subjected to a feedback control while the input r.p.m. of a transmission are being monitored. Therefore, the hydraulic pressures of the higher-speed-stage side clutch and a lower-speed-stage side clutch can be smoothly switched irrespective of the discrepancies (or deviations) of the various dimensions of the clutches, and a gearshift shock can be relieved.

What is claimed is:

1. A gearshift control apparatus for an automatic transmission wherein a clutch-to-clutch downshift achieved by release of a higher-speed-stage side clutch and engagement of a lower-speed-stage side clutch is performed in a power-ON state, comprising:

first detection means for detecting a judgement that said downshift is to be performed;

first control means for lowering a hydraulic pressure of said higher-speed-stage side clutch upon the judgement that said downshift is to be performed;

means for implementing a first quick fill operation for a predetermined time period at a beginning of introduction of oil into said lower-speed-stage side clutch;

second detection means for detecting beginning of rise in input r.p.m. of said transmission, the rise being based on the operation of said first control means;

second control means for subjecting the hydraulic pressure of said higher-speed-stage side clutch to a feedback control immediately after the detection of the beginning of the r.p.m. rise by said second detection means, so that a rise rate of the input r.p.m. of said transmission may become a specific value;

third detection means for detecting that said input r.p.m. of said transmission have been brought near to synchronous r.p.m. of the lower speed stage by the operation of said second control means; and third control means for gradually raising a hydraulic pressure of said lower-speed-stage side clutch and simultaneously for lowering said hydraulic pressure of said higher-speed-stage side clutch through a feedback control based on said input r.p.m. of said transmission, after the detection of the near synchroneity by said third detection means.

2. A gearshift control apparatus for an automatic transmission as defined in claim 1, further comprising:

means for implementing a first quick fill operation for a predetermined time period at beginning of introduction of oil into said lower-speed-stage side clutch;

means for detecting a time period since completion of said first quick fill operation for said lower-speed-stage side clutch until said lower-speed-stage side clutch begins to have a transmission torque capacity; and means for learning and correcting a timing of beginning of rise in the hydraulic pressure of said lower-speed-stage side clutch, on the basis of the detected time period.

3. A gear shift control apparatus for an automatic transmission as defined in claim 1, wherein said second control means subjects the hydraulic pressure of said higher-speed-stage side clutch to a feedback control, while keeping the hydraulic pressure of said lower-speed-stage side clutch at a substantially constant value.

4. A gearshift control apparatus for an automatic transmission as defined in claim 1, wherein said second control means alters said specific value midway of the gearshift so that the rise rate of said input r.p.m. of said transmission may become gentler.

5. A gearshift control apparatus for an automatic transmission as defined in claim 4, wherein said second control means sets said specific value in accordance with a deviation between the synchronous r.p.m. of said lower speed stage and said input r.p.m. of said transmission.

6. A gearshift control apparatus for an automatic transmission as defined in claim 1, wherein said third control means subjects said hydraulic pressure of said higher-speed-stage side clutch to the feedback control so that said input r.p.m. of said transmission may not change.

7. A gearshift control apparatus for an automatic transmission as defined in claim 6, wherein said third control means subjects said hydraulic pressure of said higher-speed-stage side clutch to said feedback control so that said input r.p.m. of said transmission may not change from a target value which is set slightly higher than the synchronous r.p.m. of said lower speed stage.

8. A gearshift control apparatus for an automatic transmission wherein a clutch-to-clutch downshift achieved by release of a higher-speed-stage side clutch and engagement of a lower-speed-stage side clutch is performed in a power-ON state, comprising:

first detection means for detecting a judgement that said downshift is to be performed;

first control means for lowering a hydraulic pressure of said higher-speed-stage side clutch upon the judgement that said downshift is to be performed;

second detection means for detecting beginning of rise in input r.p.m. of said transmission, the rise being based on the operation of said first control means;

second control means for subjecting the hydraulic pressure of said higher-speed-stage side clutch to a feedback control after the detection of the beginning of the r.p.m. rise by said second detection means, so that a rise rate of the input r.p.m. of said transmission may become a specific value;

third detection means for detecting that said input r.p.m. of said transmission have been brought near to synchronous r.p.m. of the lower speed stage by the operation of said second control means; and third control means for gradually raising a hydraulic pressure of said lower-speed-stage side clutch and simultaneously for lowering said hydraulic pressure of said higher-speed-stage side clutch through a feedback control based on said input r.p.m. of said transmission, after the detection of the near synchroneity by said third detection means;

wherein said third control means subjects said hydraulic pressure of said higher-speed-stage side clutch to the feedback control so that said input r.p.m. of said transmission may not change;

wherein said third control means subjects said hydraulic pressure of said higher-speed-stage side clutch to said feedback control so that said input r.p.m. of said transmission may not change from a target value which is set slightly higher than the synchronous r.p.m. of said lower speed stage.

9. A gearshift control apparatus for an automatic transmission as defined in claim 8, further comprising:

means for implementing a first quick fill operation for a predetermined time period at beginning of introduction of oil into said lower-speed-stage side clutch;

means for detecting a time period since completion of said first quick fill operation for said lower-speed-stage side clutch until said lower-speed-stage side clutch begins to have a transmission torque capacity; and means for learning and correcting the predetermined time period in said first quick fill operation for said lower-speed-stage side clutch, on the basis of the detected time period.

10. A gear shift control apparatus for an automatic transmission as defined in claim 8, wherein said second control means subjects the hydraulic pressure of said higher-speed-stage side clutch to a feedback control, while keeping the hydraulic pressure of said lower-speed-stage side clutch at a substantially constant value.

* * * * *